(No Model.)

J. STRAUS.
HARNESS SADDLE.

No. 309,170. Patented Dec. 9, 1884.

Attest:
Edward Stew
Geo. L. Wheelock

Inventor
Jacob Straus
By Knight Bros
Attys

UNITED STATES PATENT OFFICE.

JACOB STRAUS, OF ST. LOUIS, MISSOURI.

HARNESS-SADDLE.

SPECIFICATION forming part of Letters Patent No. 309,170, dated December 9, 1884.

Application filed September 6, 1884. (No model.)

*To all whom it may concern:*

Be it known that I, JACOB STRAUS, of the city of St. Louis, in the State of Missouri, have invented a certain new and useful Improvement in Harness-Saddles, of which the following is a full, clear, and exact description, reference being had to the accompanying drawings, forming part of this specification, and in which—

Figure 1:
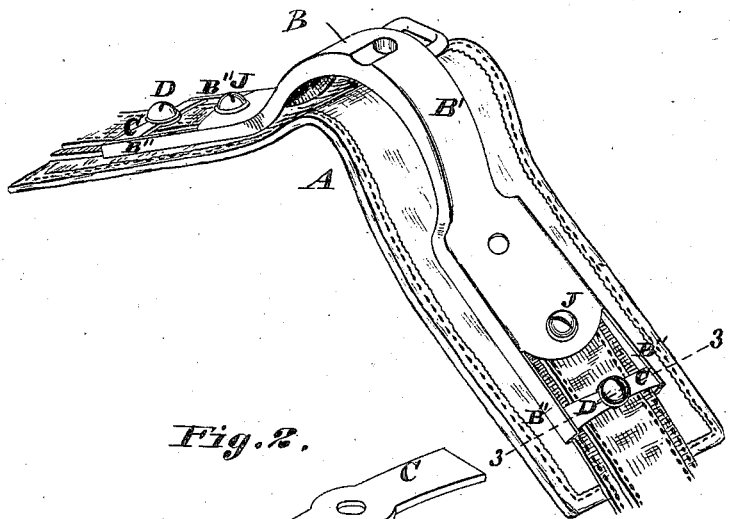
Figure 2:
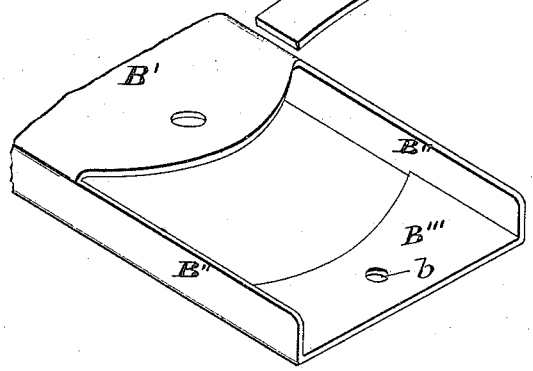
Figure 3:
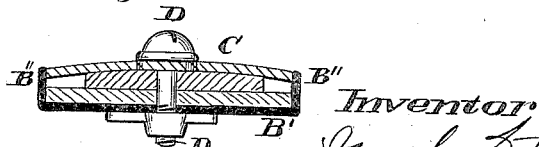

Figure 1 is a perspective view of my improved harness-saddle. Fig. 2 is an enlarged detail perspective view showing part of the plate or bar removed from the body of the tree. Fig. 3 is a transverse section taken on line 3 3, Fig. 1.

My invention relates to an improvement in those harness-saddle trees which are made in a single piece of metal, with removable plates for securing the side straps.

My improvement consists in features of novelty hereinafter fully described, and pointed out in the claim.

Referring to the drawings, A represents the pad, and B the tree, of the saddle. The body B′, side flanges, B″, and bottom plate, B‴, of the tree are made in one piece; but the cross bars or plates C at the lower ends of the tree, beneath which the side skirts or straps fit, are made removable. They are attached to the tree by screws or bolts D, or rivets, if desired, that pass therethrough, and through the straps or skirts and hole $b$ of the bottom plate, B‴, of the tree. Between the side flanges, B″, the ends of the plates fit, as shown, and the plates are thus held from turning on their pivots D. They can also be adjusted, for no matter what thickness the straps or skirts may be, the plates can always be brought down tight upon them, as will be understood. Bolts or screws J connect the straps or skirts to the tree above the keeper-plates.

I claim as my invention—

In a harness-saddle, the tree B, consisting of body B′, side flanges, B″ B″, and bottom plates, B‴, formed integral, the adjustable keeper-plates C, fitting between the side flanges, and the bolts D, securing the keeper-plates to the bottom plates, and by which the space between the keeper-plates and bottom plates can be increased or diminished to receive different thicknesses of leather, as set forth.

JACOB STRAUS.

In presence of—
GEO. H. KNIGHT,
SAML. KNIGHT.